June 5, 1945. C. E. FRANK 2,377,336
ENGINE
Filed Nov. 23, 1942 3 Sheets-Sheet 2
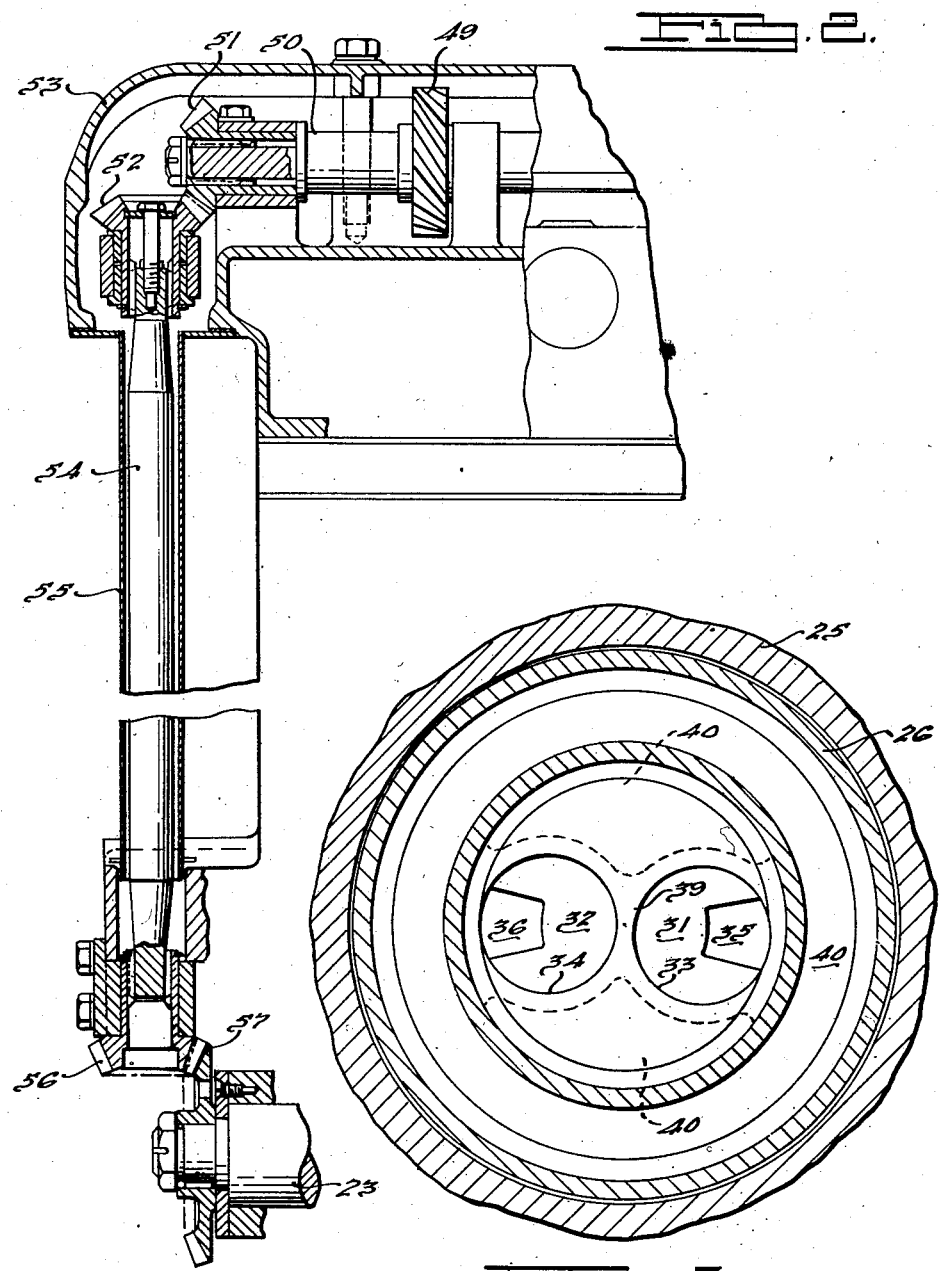
INVENTOR
Clarence E. Frank.
BY
Gray & Smith
ATTORNEYS.

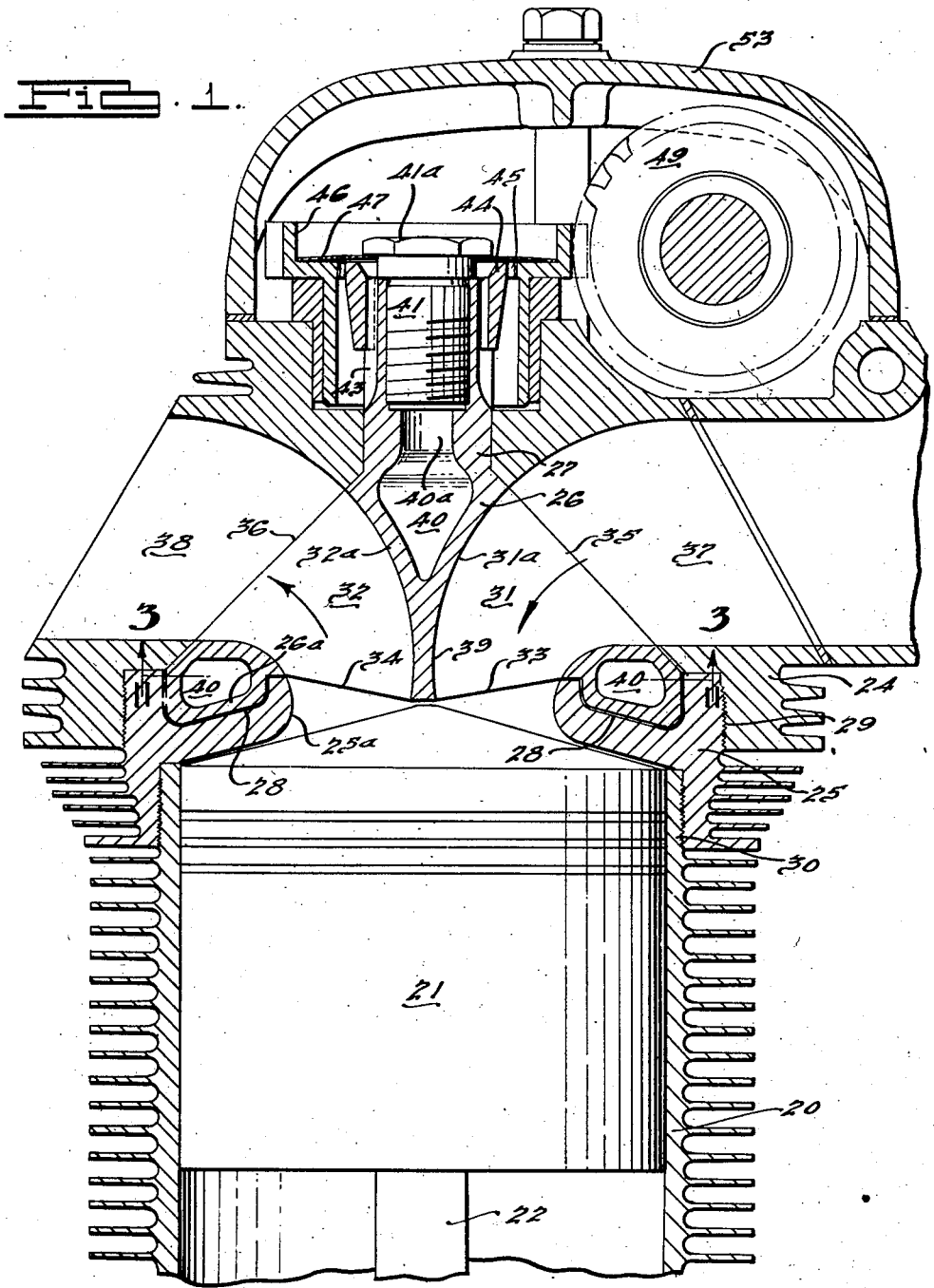

June 5, 1945.　　　C. E. FRANK　　　2,377,336
ENGINE
Filed Nov. 23, 1942　　　3 Sheets-Sheet 3

INVENTOR
Clarence E. Frank.
BY
Gray & Smith
ATTORNEYS.

Patented June 5, 1945

2,377,336

UNITED STATES PATENT OFFICE 2,377,336

ENGINE

Clarence E. Frank, Fraser, Mich., assignor to Briggs Manufacturing Company, Detroit, Mich., a corporation of Michigan Application November 23, 1942, Serial No. 466,552

20 Claims. (Cl. 123—80)

This invention relates to internal combustion engines and more particularly to engines of the two stroke cycle type.

In accordance with one object of the present invention there is provided an improved two stroke cycle engine having a rotatable valve in the cylinder head formed with a combustion chamber and ported so that firing of a compressed charge in the combustion chamber will occur during each cycle when the piston is in its position of maximum compression, or substantially so.

A further object of the invention is to provide a two stroke cycle engine having its combustion space formed largely within a rotatable valve, this space being divided into two communicating chambers and the mixture being fired simultaneously in both chambers by two spark plugs.

Another object of the invention is to provide a two stroke cycle engine having a rotatable valve provided with two communicating combustion chambers adapted alternatively to communicate one with an intake conduit and the other with an exhaust conduit and wherein the mixture or charge is fired simultaneously when the piston reaches its position of maximum compression, or substantially so.

Another object of the invention is to provide an engine of the foregoing type provided with a two chamber rotatable valve within which the fuel charge is fired twice during each revolution of the valve or after each two stroke cycle of the engine.

A further object of the invention is to provide an engine of the foregoing type having a rotatable valve, preferably of the type which rotates continuously in one direction although not necessarily so, the combustion chamber in the valve having two side ports so arranged that each port alternately communicates with exhaust and intake conduits during each revolution of the valve.

Still another object of the invention is to provide an engine as stated immediately above in which the fuel charge is fired twice during each revolution and preferably by a pair of spark plugs or ignition devices.

Another object of the invention is to provide a two stroke cycle engine of the rotatable valve type in which the combustion chamber in the valve communicates twice during each revolution with approximately diametrically opposed intake and exhaust conduits and also twice during each revolution with diametrically opposed spark plugs or ignition devices.

Another object of the invention is to provide a two stroke cycle engine of the rotatable valve type, particularly a valve having tapering sides, such as a frusto-conical valve, in which two ports are provided in the tapered sides of the valve leading to the combustion space and each port alternately communicating with an intake conduit and an exhaust conduit during each two stroke cycle of the engine.

Still another object is to provide an engine of the above description in which each side port in the valve communicates for igniting a fuel charge with each of two oppositely positioned spark plugs or ignition devices at each two stroke cycle of the engine.

Other objects of this invention will appear in the following description and appended claims, reference being had to the accompanying drawings forming a part of this specification wherein like reference characters designate corresponding parts in the several views.

Fig. 1 is a fragmentary sectional elevation illustrating a portion of a multi-cylinder engine of the two stroke cycle type embodying the present invention.

Fig. 2 is a fragmentary sectional elevation illustrating the drive for the rotatable valves of the engine.

Fig. 3 is a section taken substantially through lines 3—3 of Fig. 1 looking in the direction of the arrows.

Figure 4:
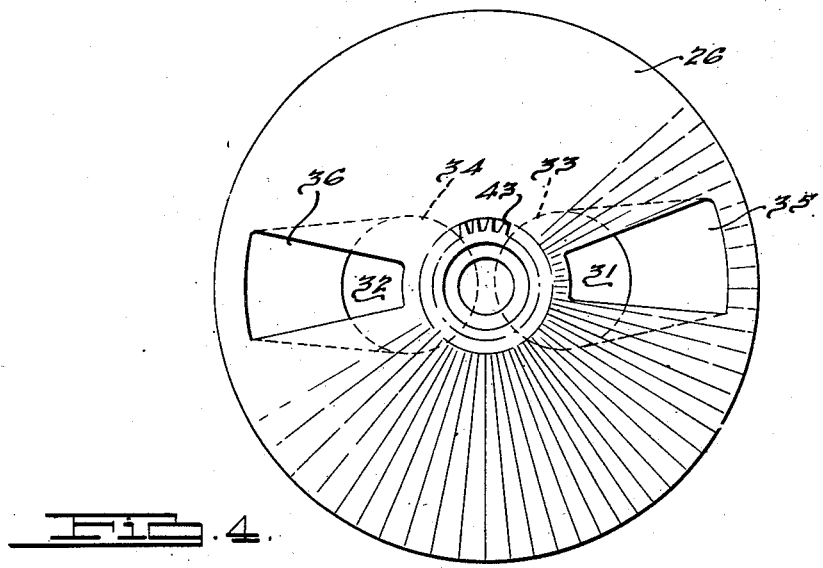
Fig. 4 is a top plan view of the rotatable valve.
Figure 5:
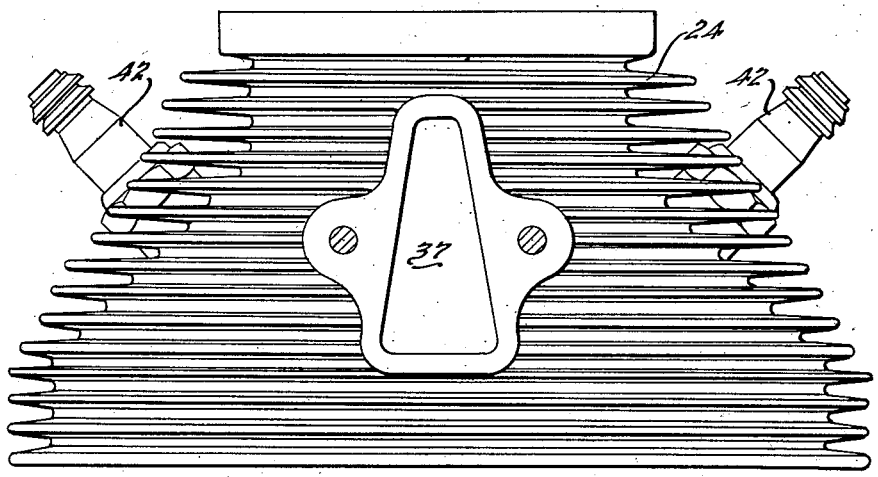
Fig. 5 is a side elevation of the cylinder head.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation.

In the drawings there is illustrated, by way of example, one embodiment of the invention as applied to an internal combustion engine of the two stroke cycle spark ignition type designed particularly for the power plant of an aircraft. The invention may obviously be embodied in engines for other purposes such as automotive, marine and industrial engines. For most uses the engine is of the multi-cylinder type, although any number of cylinder units may be employed in any given engine. In the present embodiment, for the purpose of simplicity, a single cylinder unit of the engine is illustrated, it being understood that the remaining cylinders of the engine are identical to the structure herein shown and described.

Referring to Figs. 1 and 2, the present engine comprises a suitable crankcase, not shown, to which is rigidly secured a cylinder 20. A reciprocable piston 21 is mounted within the cylinder and is adapted to be connected in the usual manner by a connecting rod 22 to the crankshaft 23.

The present engine is provided with a suitable cylinder head 24 and interposed between this cylinder head and the upper or outer end of the cylinder 20 is a mask or flame plate 25 which terminates centrally in a flange portion 25a forming the throat opening leading from the cylinder into the combustion chamber or space of a rotatable valve 26. The valve or rotor 26 comprises in the present instance a generally frusto-conical body arranged immediately above the piston 21 when at the top of its stroke, the valve terminating at its upper or outer end in a cylindrical stem 27. The bottom of the valve has an annular extension 26a confined for rotation within a correspondingly shaped recess 28 in the upper face of the mask or flame plate 25. The cylinder head 24 is secured by means of threads 29 to the mask or flame plate 25 and the latter in turn is secured by means of threads 30 to the upper end of the cylinder 20.

In the present engine the combustion chamber is formed principally within the rotor or rotatable valve 26. The valve is formed with two combustion chambers 31 and 32 having adjacent curved walls 31a and 32a which curve smoothly into the throat opening formed by the annular throat 25a of the mask or flame plate 25. The combustion chambers 31 and 32 communicate at their inner ends with the cylinder by means of annular ports 33 and 34. These chambers also terminate at opposite sides of the valve in diametrically opposed ports 35 and 36, respectively. It will be seen that the valve 26 is adapted to rotate within a cavity in the cylinder head 24 shaped substantially in accordance with the frusto-conical shape of the valve. The cylinder head is provided with an intake passage 37 and an exhaust passage 38 which are diametrically opposed. The inner ends of these passages are similar in configuration and correspond to the configuration of the side ports 35 and 36 of the valve so that each of these ports may register with either of the intake and exhaust passages 37 and 38 during operation of the engine.

It will be seen that the curved inner side walls 31a and 32a, respectively, of the combustion chambers 31 and 32 form a partition wall 39, the lower edge of which forms a part of the terminal edge of each of the ports 33 and 34 of the valve. The valve is provided with a cooling chamber 40 which extends entirely around the combustion chambers 31 and 32. Any suitable cooling or heat conducting medium may be placed within the chamber 40 such, for example, as metallic sodium. It will be noted from Fig. 1 that the tapering side of the valve 26 has a bearing on the tapering wall of the bearing cavity within the cylinder head 24. Also it will be seen that the annular extension 26a of the valve extends inwardly or below the tapered bearing surfaces of the valve and cylinder head. Thus, the extension 26a is confined at three angularly related sides within the correspondingly shaped recess 28 in the mask or flame plate 25.

The cooling cavity 40 extends well into the recess 28 in the mask plate, thus providing effective cooling for the lower portion of the valve and particularly the lower or inner tapered portion thereof which receives considerable of the bearing load. Somewhat greater clearance is provided between the adjacent surfaces of the valve extension 26a and the recess 28, thus eliminating excessive friction in these regions.

In the present preferred embodiment of the invention the fuel mixture or charge within the chambers 31 and 32 is fired simultaneously by means of two diametrically opposed spark plugs 42. Each spark plug is suitably mounted in the cylinder head 24 at a point intermediate the intake and exhaust conduits 37 and 38.

The cooling cavity 40 is accessible through an axial passage 40a in the stem 27 of the valve. This passage is counterbored and tapped to receive a plug 41 having a hex head 41a. The stem 27 is provided with external longitudinal splines 43 which cooperate with splines on a coupling member 44. The coupling member in turn is keyed by means of longitudinal splines or teeth 45 to a helical gear 46. Interposed between the bottom of a recess in the gear and hex head 41a is a spring washer 47, this washer providing resilient means for rotating slight axial movement of the valve during operation. The gear 46 meshes with a helical gear 49 secured to a top horizontal shaft 50 mounted in suitable bearings in the cylinder head. A bevel gear 51 is secured to this shaft and meshes with a bevel gear 52 secured to the upper end of a tower shaft 54. The shaft 50 together with gearing 51 and 52 and the helical gears 49 are sealed within a housing member 53 secured to the cylinder head. The tower shaft 54 extends through a casing 55 and carries at its lower end a bevel gear 56 which meshes with a bevel gear 57 secured to the crankshaft 23.

The foregoing described mechanism provides the means for driving the valves of the engine at one half engine speed. To get the proper timing, the combustion chambers in the valve will be diametrically opposed and the ports in the head will be placed to permit the exhaust valve to open approximately ten degrees ahead of the intake.

In the operation of the engine each rotor side port 35 and 36 alternately registers with the intake and exhaust conduits 37 and 38 during each complete revolution of the valve. Also each port 35 and 36 alternately registers with each of the spark plugs 42 during each complete revolution of the valve. The construction and operation are, therefore, such that the engines fires twice during each revolution of the valve. The chambers 31 and 32 simultaneously communicate with both spark plugs at the time of firing, so that the fuel charge within the chambers 31 and 32 is fired at the same time. During the descent of the piston at the power stroke the ports 35 and 36 will move simultaneously into registration with conduits 37 and 38. The fuel mixture will be forced by a suitable supercharger through intake conduit 37 and port 35 into the chamber 31 thereby scavenging this chamber, and this incoming mixture will flow down through the port 33 as the piston begins to ascend and will force the products of combustion out through the port 34, chamber 32 and port 36 into the exhaust conduit 38. During further rotation of the valve the ports 35 and 36 will be closed and the piston 21 will complete its compression stroke. When the piston reaches substantially the upper limit of its compression stroke the ports 35 and 36 will register with the spark plugs and the compressed mixture within the chambers 31 and 32 will be fired. The foregoing operation occurs during one half a revolution of the valve 26 and a two stroke cycle of the piston 21. In the next cycle the port 35, which is shown as registering with the intake conduit 37 in Fig. 1, will move into registration with the exhaust conduit 38 and the port 36 will move into registration with the intake conduit 37 whereupon the same cycle of operations will be repeated. Thus, it will be seen that the valve 26 intakes through the port 35 and exhausts through the port 36 during one half of a complete revolution of the valve and then intakes through port 36 and exhausts through port 35 during the other half of a complete revolution of the valve. Very efficient scavenging occurs by virtue of the present construction and very efficient flame propagation is achieved. As a consequence, it will be seen that the present invention provides an engine of the two stroke cycle type in which improved combustion is produced together with excellent power characteristics.

I claim:

1. In an internal combustion engine having a cylinder and a cylinder head provided with an exhaust port and an intake port, a rotatable valve within said head having similar combustion chambers, and means for rotating said valve to register said combustion chambers with the intake port and exhaust port simultaneously during a half revolution of the valve.

2. In an internal combustion engine having a cylinder and a cylinder head, a rotatable valve within said head having two similar combustion chambers each provided with a port, an exhaust conduit, an intake conduit, two opposed ignition devices, and means for rotating said valve to register each valve port with each of said conduits and ignition devices during a single revolution of the valve.

3. In an internal combustion engine having a cylinder and a cylinder head, a rotatable valve within said head having two similar combustion chambers each provided with a port, an exhaust conduit, an intake conduit, and means for rotating said valve at one half engine crankshaft speed to register each valve port with each of said conduits during a single revolution of the valve.

4. In an internal combustion engine having a cylinder and a cylinder head, a rotatable generally frusto-conical valve within said head having two similar combustion chambers each provided with a port, an exhaust conduit, an intake conduit, and means for rotating said valve to register each valve port with each of said conduits during a single revolution of the valve.

5. In an internal combustion engine having a cylinder, a reciprocable piston therein and a cylinder head, a rotatable valve in said head having two similar combustion spaces separated axially of the valve by a wall, said spaces opening into the cylinder and having diametrically opposed ports, diametrically opposed intake and exhaust conduits, and means for rotating said valve to register each port with each conduit during a three hundred and sixty degree angular movement of the valve.

6. In an internal combustion engine having a cylinder, a reciprocable piston therein and a cylinder head, a rotatable valve in said head having two similar combustion spaces separated axially of the valve by a wall, said spaces opening into the cylinder and having diametrically opposed ports, diametrically opposed intake and exhaust conduits, diametrically opposed ignition devices, and means for rotating said valve to register each port with each conduit and ignition device during a three hundred and sixty degree angular movement of the valve.

7. In an internal combustion engine having a cylinder, a reciprocable piston therein and a cylinder head, a rotatable valve in said head having two similar combustion spaces separated axially of the valve by a wall, said spaces opening into the cylinder and having diametrically opposed ports, diametrically opposed intake and exhaust conduits, diametrically opposed ignition devices, and means for rotating said valve to register each port with each conduit and ignition device during a single revolution of the valve.

8. In an internal combustion engine having a cylinder, a reciprocable piston therein and a cylinder head, a rotatable generally frusto-conical valve in said head having two similar combustion spaces separated axially of the valve by a wall, said spaces opening into the cylinder and having diametrically opposed ports in the tapering sides thereof, diametrically opposed intake and exhaust conduits, diametrically opposed ignition devices, and means for rotating said valve to register each port with each conduit and ignition device during a three hundred and sixty degree angular movement of the valve.

9. In an internal combustion engine having a cylinder and a reciprocable piston therein, a cylinder head, a rotatable valve having a combustion space provided with two ports and having communication with the cylinder, a pair of opposed intake and exhaust conduits, and means for rotating the valve to register each port in succession with said conduits during a single revolution of the valve.

10. In an internal combustion engine having a cylinder and a reciprocable piston therein, a cylinder head, a rotatable valve having a combustion space provided with two ports and having communication with the cylinder, a pair of opposed intake and exhaust conduits, and means for rotating the valve to register each port in succession with said conduits during a three hundred and sixty degree angular movement of the valve in one direction.

11. In an internal combustion engine having a cylinder and a reciprocable piston therein, a cylinder head, a rotatable generally frusto-conical valve having a combustion space provided with two diametrically opposed ports and having communication with the cylinder, a pair of opposed intake and exhaust conduits, and means for rotating the valve to register each port in succession with said conduits during a single revolution of the valve.

12. In an internal combustion engine having a cylinder and a reciprocable piston therein, a cylinder head, a rotatable valve having a combustion space provided with two ports and having communication with the cylinder, a pair of opposed intake and exhaust conduits, two opposed ignition devices, and means for rotating the valve to register each port in succession with said conduits and ignition devices during a single revolution of the valve.

13. In an internal combustion engine having a cylinder and a reciprocable piston therein, a cylinder head, a rotatable valve having a combustion space provided with two ports and having communication with the cylinder, a pair of opposed intake and exhaust conduits, two opposed ignition devices, and means for rotating the valve to register each port in succession with said conduits and ignition devices during a three hundred and sixty degree angular movement of the valve in one direction.

14. In a two stroke cycle internal combustion engine having a cylinder and a reciprocable piston therein, a rotatable valve having tapering sides converging in one direction, said valve communicating with the cylinder and having a combustion space therein and two opposed ports in said tapering sides, opposed intake and exhaust conduits, and means for rotating said valve to register each port alternately with said conduits during a three hundred and sixty degree angular movement of the valve.

15. In a two stroke cycle internal combustion engine having a cylinder and a reciprocable piston therein, a rotatable valve having tapering sides converging in one direction, said valve communicating with the cylinder and having a combustion space therein and two opposed ports in said tapering sides, opposed intake and exhaust conduits, and means for rotating said valve at one half engine speed to register each port alternately with said conduits during a three hundred and sixty degree angular movement of the valve in one direction.

16. In a two stroke cycle internal combustion engine having a cylinder and a reciprocable piston therein, a rotatable valve having tapering sides converging in one direction, said valve communicating with the cylinder and having a combustion space therein and two opposed ports in said tapering sides, opposed intake and exhaust conduits, opposed ignition devices, and means for rotating said valve to register each port alternately with said conduits and ignition devices during a three hundred and sixty degree angular movement of the valve.

17. In a two stroke cycle internal combustion engine having a cylinder and a reciprocable piston therein, a rotatable valve having tapering sides converging in one direction, said valve communicating with the cylinder and having a combustion space therein and two opposed ports in said tapering sides, opposed intake and exhaust conduits, opposed ignition devices, and means for rotating said valve at one half engine speed to register each port alternately with said conduits and ignition devices during a three hundred and sixty degree angular movement of the valve in one direction.

18. In an internal combustion engine, a frusto-conical valve having two similar combustion chambers separated axially of the valve by a wall, the bottom of the valve having two circular ports in part formed by the edge of said wall, the tapering sides of the valve having diametrically opposed ports, and means for rotating said valve at one half the engine crankshaft speed.

19. In an internal combustion engine having a cylinder with a reciprocable piston therein, a cylinder head, and a generally frusto-conical valve in the head having two similar combustion chambers separated by a central wall and terminating in two ports located at opposite sides of the terminal edge of the wall and opening into the cylinder.

20. In an internal combustion engine having a cylinder with a reciprocable piston therein, a cylinder head, a generally frusto-conical rotatable valve in the head having a central wall separating the valve into two similar combustion chambers, said valve having opposed side ports communicating with said chambers, and means between the outer end of the cylinder and the cylinder head forming an opening of less diameter than the diameter of the piston and providing constant communication between the cylinder and said combustion chambers, said opening being divided into two parts by said wall.

CLARENCE E. FRANK.